United States Patent [19]

Cogliano

[11] Patent Number: 4,609,695

[45] Date of Patent: Sep. 2, 1986

[54] ASPHALT FOAM

[75] Inventor: Joseph A. Cogliano, Pasadena, Md.

[73] Assignee: W. R. Grace & Co., Cambridge, Mass.

[21] Appl. No.: 809,554

[22] Filed: Dec. 16, 1985

Related U.S. Application Data

[62] Division of Ser. No. 734,009, May 14, 1985, Pat. No. 4,567,095, which is a division of Ser. No. 646,779, Sep. 4, 1984, Pat. No. 4,524,156.

[51] Int. Cl.$^4$ .............................................. C08L 95/00
[52] U.S. Cl. ...................................... 524/59; 521/83; 521/139; 521/140; 524/69
[58] Field of Search .................................... 524/59, 69

[56] References Cited

U.S. PATENT DOCUMENTS

| | | | |
|---|---|---|---|
| 3,790,519 | 2/1974 | Wahlorg | 524/59 |
| 4,371,640 | 2/1983 | Agarwal et al. | 524/59 |
| 4,437,896 | 3/1984 | Partanen | 524/59 |
| 4,451,598 | 5/1984 | Decroix | 524/69 |
| 4,524,156 | 6/1985 | Cogliano | 521/83 |
| 4,567,095 | 1/1986 | Cogliano | 521/83 |

*Primary Examiner*—Morton Foelak
*Attorney, Agent, or Firm*—Howard J. Troffkin; John J. Wasatonic; William L. Baker

[57] ABSTRACT

The present invention is directed to a foamed product having a substantially closed cellular configuration. The foamed product is formed from a blend of asphalt with a polyvalent metal salt of anionic group containing polymers. The resultant foam product exhibits low bulk densities and pore volumes of about 85 percent or greater.

6 Claims, No Drawings

ASPHALT FOAM

This is a division of application Ser. No. 734,009, filed May 14, 1985, now U.S. Pat. No. 4,567,095, which is a division of application Ser. No. 646,779, filed Sept. 4, 1984, now U.S. Pat. No. 4,524,156.

BACKGROUND OF THE INVENTION

The present invention is directed to a porous structure having good insulating power coupled with mechanical stability, resistance to pressure, stability to environmental conditions and ready ability to be anchored to conventional roofing membranes. The claimed structure is a porous board formed from an asphaltic composition described in detail below which is capable of being applied to the exterior of structural surfaces, such as roofs, to provide insulation to such structural surfaces and to the compartment interior thereto.

Although the porous structure of this invention shall be described herein in terms of a porous board-like structure capable of use as a part of a structural roof formation, porous structures of other shapes and for other uses can be readily envisioned from the description herein below.

Built-up roofing has been employed for many years wherein a roof deck supports a membrane which prevents penetration of moisture. Such water impermable membranes have been formed from conventional asphaltic and bituminous compositions, laminates of asphaltic or bituminous material with fibrous products, such as roofing felt, or from rubberized asphalt sheet waterproofing membranes. Insulation is normally placed directly below the roof deck to the interior of the building to aid in maintaining constant and comfortable temperature therein.

Recently, it has been found that installation of insulation material on top of the exterior surface of a roof membrane provides the advantage of maintaining the applied waterproofing membrane at a more constant temperature and, thus, causes longer life to the membrane. Such roof structures have been dubbed "upside down roofs". These roof structures are formed by first applying a waterproofing asphaltic membrane, and then applying an insulating material, such as a foam sheet product, over the membrane. The foam sheet is anchored by the use of a mastic applied to the membrane and by placing gravel, large aggragate and the like over the insulation board.

The upside-down roofing system has met not with extensive acceptance in the industry even though it has the advantage of enhancing the durability and life of the waterproofing membrane. The lack of acceptance can be traced to the insulating sheet products presently used. These products are not capable of being stable and durable upon exposure to environmental conditions such as ultraviolet radiation from the sun's rays, moisture penetration from rain and snow and to temperature variations. Further, due to the difficulty in providing an anchoring mastic which is compatible with respect to both the asphalt membrane and the insulating foam material, the foam has been found to raise away or more from the membrane and thereby reduce its effectiveness. Finally, some of the presently known insulation materials have low crush strengths which do not permit working or even walking on the final roof structure once the insulation is applied.

An object of the present invention is to provide a foam product highly suitable for forming an insulation layer of an upside down roofing formation. The foam product is capable of exhibiting a high degree of stability to environmental conditions, a high crush strength or resiliency and a ready ability to be adhered to asphaltic roofing membranes by mutually compatable mastics.

Another object is to provide a stable foam product formed from a composition composed of asphalt and a polyvalent metal salt of certain sulfonyl or carboxyl groups containing polymers and preferably, in addition, a polymeric hydrocarbon. The foam product has a bulk density of less than about 9 pounds per cubic foot and a pore volume of at least about 85 percent.

Still another object of the present invention is to provide an improved roof structure formed from a roof deck having a conventional asphaltic waterproofing membrane thereon and having foam boards of the present invention applied to the free surface of the membrane.

DETAILED DESCRIPTION OF THE INVENTION

The present invention is directed to a porous product having low bulk density which is formed from a composition composed of from 80 to 120 parts of an asphalt and from 5 to 25 parts of a synthetic polymer selected from polyvalent metal salt neutralized sulfonated or neutralized carboxylated polymers and, preferably, with from about 10 to 100 parts of a thermoplastic polymeric hydrocarbon.

Generation of a foam product requires a composition capable of undergoing various forces under selected conditions to provide the desired product. The composition must be made sufficiently fluid to be formed into a foam. This is normally done by heating the composition above its glass transition temperature to provide a fluid mass. This temperature is usually much higher than the service temperature. A blowing agent or the like provides a force under which the composition forms cell cavities. The composition must be capable of undergoing extention of the cell walls while, via its hot film strength, maintaining the cell structure during elevated temperature formation and during cooling to ambient temperatures.

Asphalt or rubber modified asphalts are generally not capable of being formed into low density foam products. Such compositions do not have the hot melt strength necessary to permit formation and maintainance of cell structure at the elevated tempertures of formation.

There has unexpectedly been presently found asphaltic compositions which can be formed into foam products having the desired properties. The composition is a substantially uniform mixture of from about 80 to 120 parts of asphalt, from about 5 to 25 parts of a polyvalent metal salt of an anionic group containing polymer and, preferably, with from about 10 to 100 parts of a thermoplastic hydrocarbon polymer "Asphalt" as used in the present disclosure and in the claims appended hereto refers to compositions having bitumen or asphalt material as its dominant constituent. The bitumens are derived as solid or semi solid material from nature or are obtained as the residue remaining after removal such as by distillation, of volatile constituents from crude petroleum or mixtures of these materials and further with a small amount of lighter petroleum material or derivatives thereof. Asphalt compositions suitable for use in forming the present foam product are commercially available compositions.

Asphalt compositions are commonly classified by penetration grade such as measured according to the procedure set forth in ASTM D-5. The penetration value is generally determined by measuring the degree of penetration of a standardized needle into a sample under standardized conditions. Hard asphalts having values of up to about 50 at 25° C. are useful in forming foam products of this invention. Preferred materials have penetration values of from 0 (a Gilsonite asphalt) to about 25 ddm (decidecimeter). Further, the asphalt should have a softening point measured by Ring and Ball method (ASTM E28-42T) of at least about 50° C. preferably above 95° C. and most preferably of at least about 110° C. Materials with values of about 155° C. have been found to be useful in forming foam products by the present invention. The upper limit of the softening point may be higher and will merely be dependent on the capabilities of the equipment used and the desired modulus of the resultant product.

The foamed product of the present invention is capable of being formed from asphalts as described above when substantially uniformly mixed with a neutralized sulfonated or neutralized carboxylated polymer as described herein below.

The neutralized sulfonated polymers of the instant invention are derived from either thermoplastic or elastomeric polymers having either olefinic or aromatic unsaturation sites. In particular, unsaturated elastomeric polymers include low unsaturated polymers such as Butyl rubber and high unsaturated polymers such as polybutadiene and polyisoprene. In addition to these elastomers, suitable sulfonic acid-containing polymers may be prepared by the polymerization of ethylene or propylene with multiolefins such as 1,4-hexadiene, dicyclopentadiene, norbornadiene, 5-methylene-2-norbornene, 5-ethylidene-2-norbornene, 5-propenyl-2-norbornene and 1,5-cyclooctadiene. Preferably, these polymers have incorporated therein about 0.2 to about 10 mole percent unsaturation; more preferably about 0.5 to about 6 percent. An example of these plastic-like polymers are products the family of terpolymers generally known as EPDM. The term "EPDM" is used in the sense of its definition as found in ASTM D-1418-64, and is intended to mean a terpolymers containing ethylene and propylene in the backbone, and unsaturation in the side chain. Illustration methods for producing these terpolymers are found in U.S. Pat. No. 3,280,082, British Pat. No. 1,030,289 and French Pat. No. 1,386,600, herein incorporated by reference. The preferred polymers contain about 45 to about 80 weight percent ethylene and about 1 to about 10 weight percent of a diene monomer, the balance of the polymer being propylene. Preferably, the polymer contains about 50 to about 70 weight percent ethylene, e.g., about 60 weight percent and about 1.0 to about 8.0 weight percent diene monomer, e.g., 4.5 weight percent. The diene monomer is preferably a non-conjugated diene 1,4-hexadiene, dicyclopentadiene, 5-ethylidene-2-norbornene, 5-methylene-2-norbornene, 5-propenyl-2-norbornene and methyl tetrahydroindene. The EPDM terpolymers found useful in the compositions of this invention usually have a number average molecular weight (Mn) as measured by GPC of about 10,000 to about 200,000 more preferably about 15,000 to about 100,000, for example, about 20,000 to about 60,000. The Mooney viscosity (ML, 1+8, 100° C.) of the EPDM terpolymer is usually about 5 to about 60, preferably about 10 to about 50, for example, about 15 to about 40. The Mv as measured by GPC of the EPDM terpolymer is preferably below about 350,000 and more preferably below about 300,000. The Mw as measured by GPC of the EPDM terpolymer is preferably below about 500,000 and more preferably below about 350,000. A typical EPDM commercially available is a terpolymer having a Mooney viscosity (ML, 1+8, 100° C.) of about 40 and having an ethylene content of about 40 weight percent and a 5-ethylidene-2-norbornene content of about 5.0 weight percent. The Mn of the commercial EPDM, as measured by GPC, is about 47,000, the Mv as measured by GPC is about 145,000 and the Mw as measured by GPC is about 174,000.

The above described polymers are sulfonated in known manners such as by dissolving them in a non-reactive solvent followed by the addition of a sulfonating agent at temperatures normally from $-100°$ C. to $+100°$ C. The sulfonating agent can be any suitable sulfonating agent such as those described in U.S. Pat. Nos. 3,042,728 and 3,836,522 which teachings are herein incorporated by reference. The resultant useful sulfonated polymer has sulphonic acid groups in about 5 to about 100 millimole equivalents per 100 grams of sulfonated polymer and preferably from about 10 to 50 and most preferably from about 15 to 40.

Neutralized sulfonated polymer can be formed with a polyvalent metal selected from metals of Groups IIA, IB, or IIB of the Periodic Table as well as metals of iron, aluminum or lead.

The resultant polyvalent metal salt of sulfonic acid group containing polymers and, in particular sulfonated EDPM polymers, when blended with asphalt in from 5 to 25 parts, preferably from 5 to 15 parts by weight per 100 parts by weight of asphalt provide a composition capable of forming a low density foamed product.

The foamed product of the present invention is also capable of being formed from asphalt and a neutralized carboxylated polymer as described below. The neutralized carboxylated polymers used in the instant invention is a copolymer formed from the polymerization of ethylene or propylene with a carboxylic acid containing or forming comonomer as, for example, acrylic acid, a $C_1$-$C_3$ alkyl substituted acrylic acid, such as methacrylic acid, as well as lower alkyl esters (such as methyl) of acrylic or methacrylic acid which can be subsequently hydrolyzed in known manners to provide the free carboxylic acid group in the polymer. The polymer is neutralized with a polyvalent metal as described above with respect to the sulfonated polymers. The resultant polymer should have a melt index (ASTM D-1238) of from about 0.7 to 1.5 Decigm/min and a glass transitition temperature (by differential thermal analysis) of from about 80° to 95° C.

The preferred neutralized carboxylated copolymer are formed from ethylene and methacrylic acid and are neutralized with zinc metal cations. The preferred melt index of the polymer is from about 0.9 to 1.1 and glass transition temperature is from about 88° to 95° C.

The neutralized anionic polymers described above are known and can be commercially obtained. Neither the polymers, per se, nor their preparation are regarded as part of the present invention. The preferred neutralized anionic polymers are the sulfonated EPDM polymers.

The preferred asphaltic composition used to form the porous structure of the present invention further contains a thermoplastic hydrocarbon polymer such as polyethylene, polypropylene, polybutadiene or polystyrene or their copolymers such as styrene acrylonitrile copolymers. These polymers have been found to further aid in the formation and retention of the pore cells over the temperature gradient required for processing.

The composition used in forming the subject foam product can further contain conventional additives such as antioxidants, stabilizers, fillers, nucleating agents (for bubble formation) and the like as is required for a particular application.

The above compositions are formed into a substantially uniform mixture by mixing the asphalt and the polymeric materials (neutralized anionic group containing polymer with or without thermoplastic hydrocarbon polymer) in a mixing apparatus, such as a sigma blade mixer, at elevated temperatures. The mixing temperature should be sufficiently high to cause each of the components to be in a fluid state. These temperatures will depend upon the softening temperature of the asphaltic material and the glass transition temperature of the polymeric materials used in forming a specific mixture. It has been found preferable to use polymers of higher glass transition temperature when using asphalt of a high softening temperature (e.g. Gilsonite) and, similarly polymers of low glass transition temperatures with asphalts of low softening points. The mixing temperature is normally from 120° to 200° C. The mixed composition is normally allowed to cool to a solid mass which is subsequently processed into particulate material, such as pellets, suitable as a feed for an extrusion apparatus.

The foam product can be formed using conventional apparatus such as a Brabender or a Twin Screw extruder or the like. The mixed composition is heated in the extruder to temperatures of from 120° to 200° C. The foams are formed by injecting any inert gaseous material, such as carbon monoxide, carbon dioxide, nitrogen, halogenated hydrocarbons (Freon), methane, LPG and the like into the mass just prior to the egress of the mass from the extruder die. The gaseous foaming agent can be uniformly injected into the mass using conventional apparatus. The foamed product can be formed into various shapes through the combined effects of the extruder die and subsequent processing. If allowed to freely form, it will produce a "bun" shape while, if formed between moving belts, it will form a flat top product.

The resultant cooled porous foam product will generally have small closed pore configuration and a skin which will make the foam substantially impervious to moisture. It has been found that foam products having a low bulk density of from about 3.5 to 9 pounds per cubic foot and crush strength of from about 10 to 60 psi can be readily achieved according to the presently described material. Foam products of even lower densities can be produced where crust strength is not a major consideration.

The following examples are given for illustrative purposes only and are not meant to be a limitation on the invention as defined by the claims appended hereto. All parts and percentages are by weight unless otherwise indicated.

EXAMPLE I 100 parts of Gilsonite, a naturally occuring, high melting asphatic material (Ring and Ball=160° C.) was added to a sigma blade mixer maintained at 170°-190° C. After complete melting of the Gilsonite, 100 parts of polypropylene (Rexene PP31S4A) was blended in followed by 2 parts Zinc stearate and then 10 parts of sulfonated EPDM (Uniroyal 2095) polymer. This last addition changed the consistency of the mix from a viscous material to a rubbery mass. The hot material was removed from the mixer. After cooling the material was ground into ⅛ inch particles using a rotating knife cutter. Tensile properties of the formed material was determined to be: (at 70° C.) Stress of 1050 psi. Strain of 7% and Modulus of 37,100 psi.

The formed particulate material was feed into a ¾ inch 25:1 ratio extruder equipt with a venting screw. A blowing agent, Freon 114, was pumped into the venting section via a high pressure metering pump capable of generating 1500 psi pressure to counteract the pressure developed in the extruder. A release valve set at 300 psi maintained the Freon 114 as a liquid until it reached the extruder barrel. Separate samples were made using a ⅛ inch diameter die to form a cylindrical foam product. Sheets of the materials were formed using a co-rotating twin screw extruder equipt with an oil heated die having a 3"×0.045" slit to form sheets having cross-sectional dimensions of 8"×⅝". The die temperature was maintained at about 180° C. The rate of injection of blowing agent was varied to produce foam products of varying density and crush strength. All products formed were examined and observed to be of a uniform, small, closed cell structure with a skin on the outer surface. The density and crush strength (according to ASTM D-1621) of the materials formed are given in Table I below.

EXAMPLE II

A series of foamed products were formed in the same manner as described in Example I above except that the thermoplastic hydrocarbon of Example I (polypropylene) was replaced by polyethylene or styrene/acrylonitrile copolymer in indicated amounts. In each case the foam product was observed to have a uniform, closed cell structure of low density. The density and crush strength was determined for each product and are reported in Table I below.

EXAMPLE III

For comparative purposes, attempts were made to form foam products from Gilsonite alone or from Gilsonite with polypropylene or with styrene/acrylonitrile copolymer (each at 30 parts per 100 parts Gilsonite and with 1 part talc as nucleating agent) in the same manner as described in Example I above. These compositions could only form high density products of poor quality. Gilsonite alone yielded a foam product having a density of 27 lbs/ft$^3$ while Gilsonite (100) PP(30) Talc(1) formulation formed a foam product having a density of 22 lbs/ft$^3$). Gilsonite/SAN/Talc formulations could not produce a foam product as they collapsed during formation.

TABLE I

| FORMULATION (parts by weight) | DENSITY lb/ft$^3$ | CRUSH STRENGTH psi |
|---|---|---|
| G(100)PP(100)SEPDM(10)ZnSt(2) | 5.5 | 13 |
| | 5.7 | 15.5 |
| | 6.1 | 15 |
| | 6.4 | 16 |
| G(100)PE(100)SEPDM(10)ZnSt(2) | 4.9 | 9 |
| | 5.2 | 9 |
| | 5.5 | 11 |
| | 7.4 | 17 |
| G(100)SAN(100)SEPDM(20)ZnSt(2) | 3.7 | 14 |
| | 4.3 | 27 |
| | 4.8 | 21 |
| | 5.5 | 30 |
| | 6.5 | 45 |
| | 6.9 | 40 |
| | 7.3 | 40 |
| | 7.5 | 50 |
| | 7.8 | 58 |
| G(100)SAN(30)SEPDM(10)ZnSt(2) | 4.6 | 9 |
| | 6.1 | 13 |
| | 6.9 | 19 |
| | 7.0 | 19 |

G = Gilsonite (Ring & Ball of 320° F.); PP = polypropylene (Rexene PP31S4A); PE = polyethylene (USI LB 830); SAN = Styrene/Acrylonitrile copolymer (Dow Tyril 867B); ZnSt = Zinc stearate

EXAMPLE IV

Foam products were formed from compositions composed of 100 parts of a soft asphalt (Pioneer P-566) having Ring & Ball softening of 115°–125° C. and penetration value of 15 ddm and 10 parts of ethylene/acrylic acid zinc salt copolymer (Surlyn 1801 of DuPont).

The asphalt and copolymer were mixed at 140° C. to a homogeneous mixture in a Baker Perkins mixer. The hot mixture was poured into a release paper lined container and then cooled. Upon cooling, it was chopped into pieces and ground into pellets. The composition had tensile properties of Stress of 6 psi, Strain of 650% and Modulus of Elasticity of 337 psi.

The pelletized material mixed with 5% talc was extruded in the same manner as described in Example I above and produced a foamed product having uniform small closed cell structure with a skin on the outer surface. The foam products had densities of from about 3.9 to about 6 lbs/ft$^3$ and exhibited high resiliency.

What is claimed is:

1. A composition comprising gilsonite and a polyvalent metal salt of an anionic group containing polymer selected from polyvalent metal salt neutralized sulfonated polymers or polyvalent metal salt neutralized carboxylated polymers.

2. A composition of claim 1 further comprising a thermoplastic polymeric hydrocarbon.

3. A composition of claim 2 wherein said polymeric hydrocarbon is selected from the group consisting of polypropylene, polyethylene and styrene/acrylonitrile copolymers.

4. A composition of claim 1 wherein the anionic group containing polymer is a sulfonated EPDM.

5. A composition of claim 1 wherein the anionic group containing polymer is a copolymer of ethylene with acrylic acid or $C_1$–$C_3$ alkyl substituted acrylic acid or a copolymer of propylene with acrylic acid or $C_1$–$C_3$ alkyl substituted acrylic acid.

6. A composition of claim 5 further comprising a thermoplastic hydrocarbon selected from the group consisting of polypropylene, polyethylene and styrene/acrylonitrile copolymers.

* * * * *